US009481356B2

(12) United States Patent
Nakanishi et al.

(10) Patent No.: US 9,481,356 B2
(45) Date of Patent: Nov. 1, 2016

(54) ENGINE STOP CONTROL DEVICE FOR HYBRID VEHICLE

(75) Inventors: Naoki Nakanishi, Susono (JP); Yasuyuki Kato, Susono (JP); Yukihiko Ideshio, Nisshin (JP); Susumu Kojima, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 14/235,609

(22) PCT Filed: Jul. 28, 2011

(86) PCT No.: PCT/JP2011/067340
§ 371 (c)(1),
(2), (4) Date: Feb. 20, 2014

(87) PCT Pub. No.: WO2013/014797
PCT Pub. Date: Jan. 31, 2013

(65) Prior Publication Data
US 2014/0172219 A1    Jun. 19, 2014

(51) Int. Cl.
*B60W 20/00* (2016.01)
*B60W 10/06* (2006.01)
*B60K 6/48* (2007.10)
(Continued)

(52) U.S. Cl.
CPC ............. *B60W 20/00* (2013.01); *B60K 6/48* (2013.01); *B60W 10/02* (2013.01); *B60W 10/06* (2013.01); *B60W 10/08* (2013.01); *B60W 20/40* (2013.01); *F02N 19/005* (2013.01); *F02N 99/006* (2013.01); *F16D 48/00* (2013.01); *B60K 2006/4825* (2013.01); *B60W 2510/0685* (2013.01); *F02N 2019/008* (2013.01); *Y02T 10/6221* (2013.01); *Y02T 10/6252* (2013.01); *Y02T 10/6286* (2013.01); *Y10S 903/93* (2013.01)

(58) Field of Classification Search
CPC ....... F02N 11/08; F02N 11/00; B60W 20/00; B60W 10/08; B60W 10/06; B60W 10/02; Y10S 903/93
See application file for complete search history.

(56) References Cited

U.S. PATENT DOCUMENTS 7,524,266 B2 *  4/2009  Nobumoto ............ B60W 10/06
                                                          477/107
8,347,840 B2 *  1/2013  Fleckner ............... F02N 19/005
                                                          123/179.3
(Continued)

FOREIGN PATENT DOCUMENTS

DE    10 2007 035 936 A1    2/2009
JP         A-6-17727         1/1994
(Continued)

*Primary Examiner* — Tuan C. To
(74) *Attorney, Agent, or Firm* — Oliff PLC

(57) ABSTRACT

When a K0 clutch 34 is interrupted to stop a direct injection engine 12 during vehicle running, if a stop position of a crankshaft 114 is out of a range of a target stop range φtarget, the once interrupted K0 clutch 34 is temporarily frictionally engaged to slightly rotate the crankshaft 114. As a result, the crankshaft 114 stopped near compression TDC (top dead center) is rotated to and stopped in a minimum region of pumping energy in combination with a pumping action. Since the minimum region of the pumping energy overlaps with the target stop range φtarget suitable for ignition start associated with a small assist torque at the time of engine start, the ignition start can properly be performed at the next engine start and the assist torque at the time of engine start can be reduced.

9 Claims, 12 Drawing Sheets

(51) Int. Cl.
 B60W 10/02 (2006.01)
 B60W 10/08 (2006.01)
 F02N 19/00 (2010.01)
 F02N 99/00 (2010.01)
 F16D 48/00 (2006.01)

(56) References Cited

U.S. PATENT DOCUMENTS

| | | | | |
|---|---|---|---|---|
| 8,521,397 B2* | 8/2013 | Seils | ................. | B60K 6/24 123/198 F |
| 2004/0065309 A1* | 4/2004 | Verschoor | ............. | F01N 3/2006 123/568.11 |
| 2004/0123587 A1* | 7/2004 | Kamiya | ............... | F02D 41/0235 60/284 |
| 2005/0113211 A1 | 5/2005 | Surewaard et al. | | |
| 2006/0048734 A1 | 3/2006 | Kataoka et al. | | |
| 2007/0233357 A1* | 10/2007 | Sugai | ................ | B60K 6/48 701/105 |
| 2009/0037085 A1* | 2/2009 | Kojima | ................ | F02N 99/006 701/113 |
| 2009/0070020 A1* | 3/2009 | Tetsuno | ............... | F02D 35/026 701/113 |
| 2009/0105038 A1 | 4/2009 | Weiss et al. | | |
| 2010/0000487 A1* | 1/2010 | Hoshino | ............... | F02D 35/025 123/179.4 |
| 2010/0095915 A1* | 4/2010 | Evans-Beauchamp | . | F02B 33/40 123/68 |
| 2010/0276218 A1* | 11/2010 | Thompson | ........... | B60K 6/365 180/65.28 |
| 2011/0232596 A1* | 9/2011 | Patterson | ........... | F02N 11/0814 123/179.3 |
| 2013/0311052 A1* | 11/2013 | Edamura | ............. | E02F 9/123 701/50 |
| 2013/0312719 A1* | 11/2013 | Mikashima | ......... | F02D 41/0055 123/568.21 |
| 2013/0319361 A1* | 12/2013 | Furuishi | ................ | F02D 29/02 123/179.3 |

FOREIGN PATENT DOCUMENTS

| | | |
|---|---|---|
| JP | 2004263566 A | 9/2004 |
| JP | A-2005-155549 | 6/2005 |
| JP | A-2006-71056 | 3/2006 |
| JP | A-2006-125342 | 5/2006 |
| JP | A-2007-270769 | 10/2007 |
| JP | A-2007-270773 | 10/2007 |
| JP | A-2009-527411 | 7/2009 |

\* cited by examiner

| NUMBER OF CYLINDERS | NON-IGNITABLE STOP POSITION EXAMPLE | IGNITABLE STOP POSITION EXAMPLE |
|---|---|---|
| 8 | |  |
| 6 |  |  |
| 4 |   |  |
| 3 |   |  |
| 2 |   |  |

TWO-CYLINDER ENGINE

THREE-CYLINDER ENGINE

FOUR-CYLINDER ENGINE

SIX-CYLINDER ENGINE

EIGHT-CYLINDER ENGINE

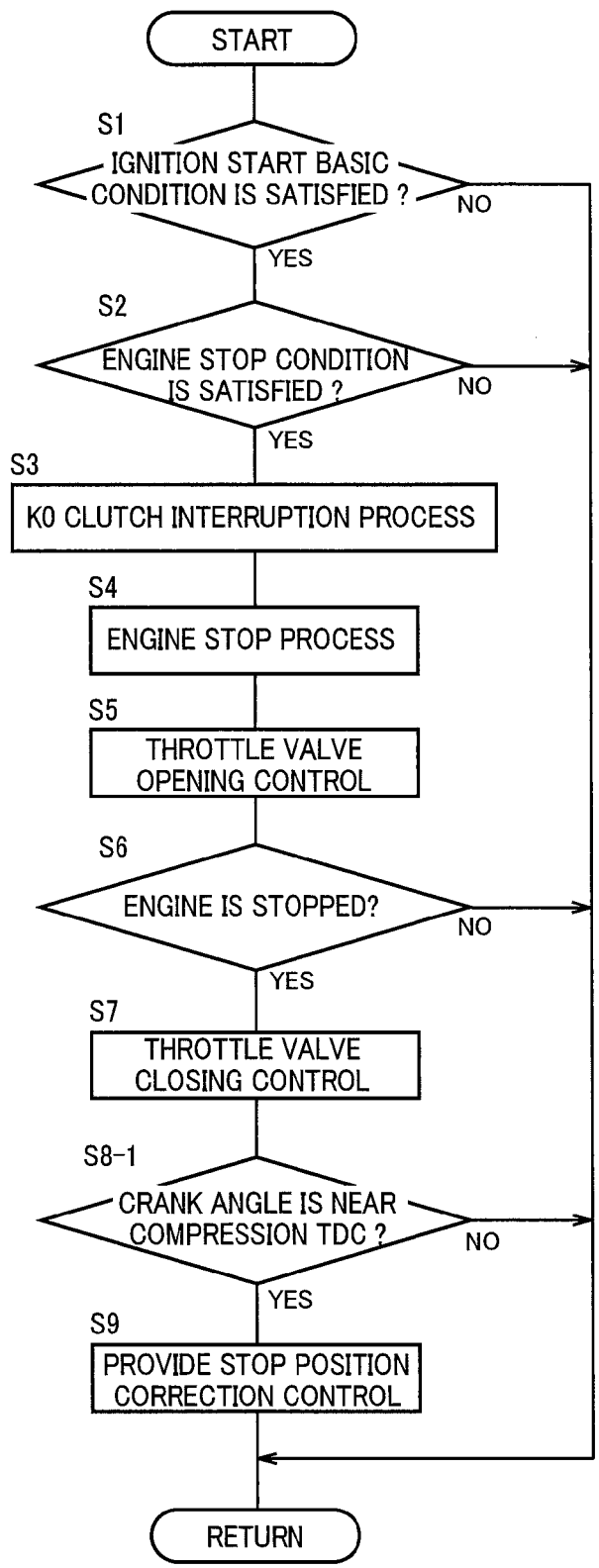

ENGINE STOP CONTROL DEVICE FOR HYBRID VEHICLE

TECHNICAL FIELD

The present invention relates to an engine stop control device of a hybrid vehicle including a direct injection engine.

BACKGROUND ART

A hybrid vehicle is known that has (a) a direct injection engine directly injecting fuel into a cylinder, (b) a clutch connecting/disconnecting (coupling/interrupting) the direct injection engine to/from a power transmission path, and (c) a rotating machine at least acting as an electric motor and (d) that can use the direct injection engine and the rotating machine as a drive power source for running. A hybrid vehicle described in Patent Document 1 is an example thereof and, during motor running using only the rotating machine as the drive power source for running, a friction clutch is connected (frictionally engaged) to rotate and adjust a crankshaft of the direct injection engine such that a crank angle in a cylinder in an expansion stroke falls within a predetermined range so as to inject fuel into the cylinder in the expansion stroke for ignition at the time of engine start in a described technique of ignition start. Patent Document 2 relates to an engine drive vehicle including a direct injection engine and, when idling is stopped (engine is stopped) during vehicle stop, a crank angle of a cylinder in an expansion stroke at the time of engine stop is put into a predetermined angle range enabling ignition start by output adjustment through electric generation (rotation load) by an alternator and throttle control in preparation of the next engine start in a described technology.

Although the engine can start by itself only with the ignition start in some cases such as when friction of the direct injection engine is small, the clutch can be connected at the time of engine start as needed to assist cranking with the rotating machine, and assist torque can significantly be reduced by the ignition start. As a result, maximum torque of the rotating machine can be reduced to achieve reduction in size and fuel consumption.

PRIOR ART DOCUMENTS

Patent Documents

Patent Document 1: Japanese Unexamined Patent Application Publication (Translation of PCT Application) No. 2009-527411
Patent Document 2: Japanese Laid-Open Patent Publication No. 2005-155549

SUMMARY OF THE INVENTION

Problem to Be Solved by the Invention

However, in Cited Document 1, since the clutch is simply connected (frictionally engaged) for a constant time during stop of the direct injection engine to rotate the crankshaft, the crank angle cannot promptly be put into a predetermined range and may not be in time for engine start. In Cited Document 2, a stop position of the crankshaft is adjusted by a rotation load of the alternator; however, in the case of a hybrid vehicle having the direct injection engine connected/disconnected to/from a power transmission path by the clutch, the connection of the clutch only rotates the crankshaft such that differential rotation becomes smaller, and cannot put a brake and, therefore, the technique described in Cited Document 2 is not applicable to the hybrid vehicle described in Cited Document 1 for adjusting the crank angle during engine stop.

Although not yet known, according to experiments and studies of the present inventors, since a crank angle of each cylinder can be shifted by 90 degrees in the case of an eight-cylinder four-cycle engine, one or two cylinders are in the expansion stroke at the time of engine stop and a crankshaft is often automatically stopped within a range enabling the ignition start because of potential energy due to pumping action (spring-like action due to compression of air); however, the crankshaft may stop near compression TDC (top dead center) at the probability of about 10%. FIG. 8 depicts a calculated relationship of a crank angle in the expansion stroke (0 degrees=compression TDC) to the potential energy due to pumping (pumping energy) and the assist torque required at the time of start, and a crest of the pumping energy is located near the crank angle of 0 degrees, i.e., the compression TDC, regardless of the number of cylinders, and a crankshaft is stopped near the peak thereof because of a balance in the rotation direction and the friction of the engine.

If a crankshaft stops near the compression TDC, in the case of an eight-cylinder engine, since the previous cylinder in the vicinity of a crank angle of 90 degrees and is still in the expansion stroke, the ignition start can be achieved; however, an exhaust valve shortly opens to start an exhaust stroke (e.g., near 120 degrees) and, therefore, sufficient rotation energy is not expected and a large assist torque is required at the time of start. In the case of two- to six-cylinder engines, since the previous cylinder has already passed through the expansion stroke, no cylinder is in the expansion stroke and the ignition start itself is impossible.

The present invention was conceived in view of the situations and it is therefore an object of the present invention to allow a crankshaft to stop at a position (crank angle) suitable for ignition start in a hybrid vehicle having a direct injection engine connected/disconnected to/from a power transmission path by a clutch, when the clutch is interrupted to stop the direct injection engine during running.

Means for Solving the Problem

To achieve the object, the first aspect of the invention provides an engine stop control device of a hybrid vehicle having (a) a plurality of cylinders, a direct injection engine directly injecting fuel into the cylinders, (b) a clutch connecting/disconnecting the direct injection engine to/from a power transmission path, and (c) a rotating machine at least acting as an electric motor, (d) the hybrid vehicle using the direct injection engine and the rotating machine as a drive power source for running and performing an ignition start for starting the direct injection engine by injecting fuel into the cylinders with a piston stopped in an expansion stroke while an assist torque is provided by the rotating machine, wherein (e) when the clutch is interrupted to stop the direct injection engine during running, the once interrupted connection/disconnection device is temporarily connected at the time of the engine stop or immediately after the engine stop and within a time when a pumping action due to compression of air in the cylinders is acquired, and thereby a crankshaft being separated from a crest of a pumping energy generated near compression TDC at which a piston in any of the cylinders of the direct injection engine reaches a top dead center after a compression stroke and the crankshaft being stopped automatically at a crank angle defined to correspond to a minimum region of the pumping energy.

The second aspect of the invention provides the engine stop control device of a hybrid vehicle recited in the first aspect of the invention, wherein the connection process of the clutch is defined such that at least one of a plurality of cylinders of the direct injection engine is in an expansion stroke and that the crankshaft is stopped within a predefined target stop range suitable for an ignition start in which the direct ignition engine is started by injecting fuel into the cylinder and igniting the fuel.

The third aspect of the invention provides the engine stop control device of a hybrid vehicle recited in the first or second aspect of the invention, wherein the connection process of the clutch generates a connection torque capable of overcoming friction of the direct injection engine to rotate the crankshaft, and wherein if a crank angle exceeds a predefined control stop position, the clutch is immediately interrupted.

The fourth aspect of the invention provides the engine stop control device of a hybrid vehicle recited in the first or second aspect of the invention, wherein the connection process of the clutch generates a connection torque capable of overcoming friction of the direct injection engine to rotate the crankshaft, for a constant time defined in advance.

The fifth aspect of the invention provides the engine stop control device of a hybrid vehicle recited in the second aspect of the invention, wherein (a) the connection process of the clutch is provided if a stop position of the crankshaft at the time of the engine stop is deviated from the target stop range, and wherein (b) the stop position of the crankshaft is estimated based on a swing-back point of the crankshaft.

The sixth aspect of the invention provides the engine stop control device of a hybrid vehicle recited in any one of the first to fourth aspects of the invention, wherein the connection process of the clutch is provided regardless of a stop position of the crankshaft at the time of the engine stop.

The seventh aspect of the invention provides the engine stop control device of a hybrid vehicle recited in any one of the first to sixth aspects of the invention, wherein when the clutch is interrupted to stop the direct injection engine, an intake air amount adjustment valve is subjected to opening control.

The eighth aspect of the invention provides the engine stop control device of a hybrid vehicle recited in any one of the first to seventh aspects of the invention, wherein when the clutch is temporarily connected, output of the rotating machine is increased.

Effects of the Invention

In the engine stop control device of the hybrid vehicle as described above, since the once interrupted clutch is temporarily connected at the time of the engine stop or immediately after the engine stop, even though the crankshaft stops near the compression TDC, the crankshaft is rotated by the engagement of the clutch, thereby separating from near the compression TDC and being stopped at a crank angle associated with a low pumping energy. In particular, the pumping action due to compression of air in the cylinder can be acquired before air leaks out the cylinder at the time of engine stop or immediately after the stop and the crankshaft can automatically be stopped at a crank angle associated with a low pumping energy. Since the crank angle of the low pumping energy overlaps with a range of the crank angle suitable for the ignition start associated with a relatively small assist torque for cranking at the time of engine start, the ignition start can properly be performed at the next engine start and the assist torque at the time of engine start can be reduced.

Since a connection process of the clutch is executed within a time when a pumping action due to compression of air in the cylinder is acquired, and a crankshaft is automatically stopped at a crank angle associated with low pumping energy, the ignition start can properly be performed at the next engine start. In particular, since an amount of air in a cylinder differs depending on an opening degree of an intake air amount adjustment valve (such as a throttle valve) at the time of engine stop and, if the direct injection engine is stopped with the intake air amount adjustment valve opened, since sufficient air is sucked in the cylinder, the pumping action is acquired for a relatively long time; however, if the direct injection engine is stopped with the intake air amount adjustment valve closed, since an intake air amount in the cylinder is small, the pumping action is lost in a relatively short time due to air leak and, therefore, the crankshaft must be rotated in a short time by the connection process of the clutch so as to stop the crankshaft at a predetermined crank angle with the pumping energy.

In the second aspect of the invention, since the connection process of the clutch (connection torque and connection time) is defined such that at least one of a plurality of cylinders of the direct injection engine is in an expansion stroke and that the crankshaft is stopped within a target stop range suitable for an ignition start, the ignition start can properly can be performed at the next engine start. For example, as the third aspect of the invention, the connection process of the clutch generates a connection torque capable of overcoming friction of the direct injection engine to rotate the crankshaft, and if a crank angle exceeds a predefined control stop position, the clutch is immediately interrupted. As a result, the crankshaft can be rotated from near the compression TDC and can be stopped within the target stop range in combination with the pumping action. As the fourth aspect of the invention, the connection process of the clutch generates a connection torque capable of overcoming friction of the direct injection engine to rotate the crankshaft, for a constant time defined in advance. As a result, the crankshaft can be rotated from near the compression TDC and can be stopped within the target stop range in combination with the pumping action.

The fifth aspect of the invention is a case that the connection process of the clutch is provided if a stop position of the crankshaft at the time of the engine stop is deviated from the predefined target stop range, and since the stop position of the crankshaft is estimated based on a swing-back point of the crankshaft, it can promptly be determined whether the stop position of the crankshaft is deviated from the target stop range and the connection process of the clutch can properly be provided within a time when the pumping action is acquired.

The sixth aspect of the invention is a case that the connection process of the clutch is provided regardless of a stop position of the crankshaft at the time of the engine stop and, since the control can rapidly be provided, the connection process of the clutch can properly be provided within the time when the pumping action is acquired and the control is simplified and the device is inexpensively configured. In this case, even when the stop position of the crankshaft is within the target stop range, the connection process of the clutch is provided and the crankshaft is rotated; however, in the case of the direct injection engine having four or more cylinders, the crankshaft is swung back by the pumping action and can be stopped within the target stop range again.

In the seventh aspect of the invention, since the intake air amount adjustment valve is subjected to opening control when the clutch is interrupted to stop the direct injection engine, sufficient air is sucked into the cylinder and the pumping action is acquired for a relatively long time and the crankshaft can be automatically stopped at a crank angle associated with a low pumping energy by a connection process of the clutch.

In the eighth aspect of the invention, since output of the rotating machine is increased when the clutch is temporarily connected, occurrence of a shock due to drive power variation etc. is suppressed by the connection of the clutch when the crankshaft is rotated.

BRIEF DESCRIPTION OF THE DRAWINGS

FIG. 12 is a diagram for explaining yet another example of the present invention and a flowchart used instead of FIG. 3.

MODE FOR CARRYING OUT THE INVENTION

Figure 1:
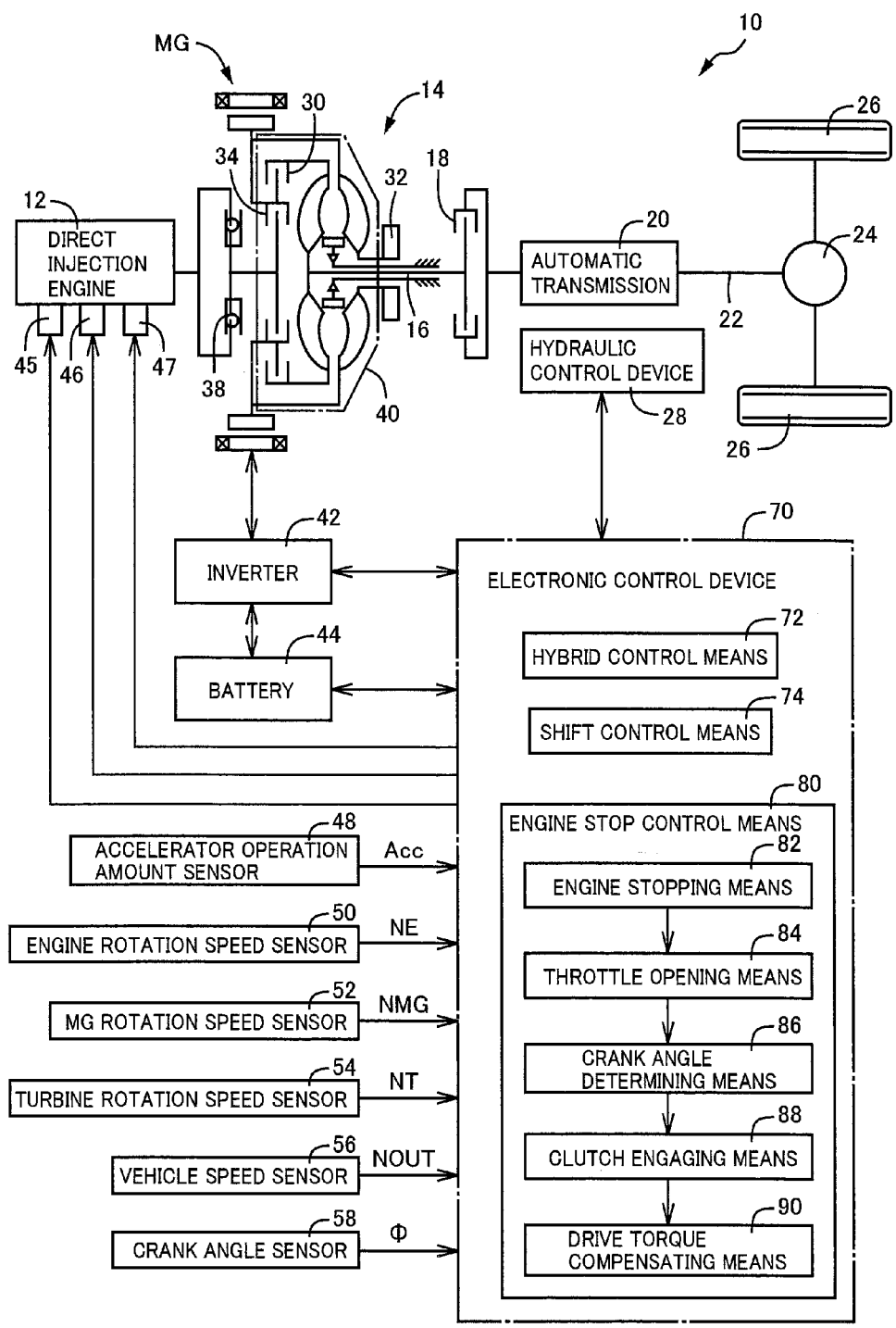
FIG. 1 is a diagram of a general configuration indicating a schematic of a hybrid vehicle to which the present invention is preferably applied along with a main portion of a control system.

The present invention is applied to a hybrid vehicle of a parallel type etc., having a direct injection engine connected/disconnected to/from a power transmission path by a clutch and is applied to engine stop control when the direct injection engine is stopped during a motor running mode for running by using only a rotating machine as a drive power source, during vehicle deceleration, etc. A frictional engagement clutch of a single-plate type, a multi-plate type, etc., is preferably used for the clutch.

The hybrid vehicle of the present invention can use the direct injection engine and the rotating machine as a drive power source for running and, for the rotating machine, a motor generator is preferably used that can selectively use functions of both an electric motor and an electric generator. A four-cycle gasoline engine is preferably used for the direct injection engine and, although particularly preferably applied to a multi-cylinder engine having four or more cylinders, the direct injection engine is also applicable to two- and three-cylinder engines. Another reciprocating internal combustion engine such as a two-cycle gasoline engine is also usable that can inject fuel into a cylinder in an expansion stroke to perform the ignition start.

A crankshaft is rotated by temporarily connecting the clutch at the time of engine stop or immediately after engine stop and the time immediately after engine stop is a time when a pumping action is acquired, and although it varies depending on an operational state, sealing performance, etc., of an intake air amount adjustment valve at the time of engine stop, the time may be within about one second after engine stop, for example. The time of engine stop may be not only a time when the rotation of the direct injection engine actually stops but also a time before the direct injection engine completely stops given that the stop position of the crankshaft (crank angle) at the time of engine stop is predictable or, if the crankshaft swings back, the time may be a time point of the swinging-back or a time point when the engine rotation speed turns to zero for the first time. The term "temporarily" means an extremely short time enabling rotation of the crankshaft from near compression TDC to a crank angle associated with low pumping energy if the crankshaft stops near compression TDC and, although it varies depending on the number of cylinders etc., for example, when the crankshaft is rotated by about five to ten degrees, the crankshaft can be separated from a crest of the pumping energy and then automatically rotates to a minimum region that is a bottom of the pumping energy. The connected state of the clutch may be continued until the minimum region of the pumping energy is reached.

In the third and fourth aspects of the invention, a connection torque is generated that can overcome the friction of the direct injection engine to rotate the crankshaft; however, this connection torque is a torque slightly larger than the friction of the direct injection engine and is not so large as a torque for climbing over the crest of the pumping energy and, when the clutch is interrupted, the crankshaft automatically stops in the minimum region of the pumping energy due to swing-back etc. In the case of a two- or three-cylinder engine, since the minimum region of the pumping energy is larger than the expansion stroke (about 0 to 120 degrees) and exceeds a target stop range associated with a lower assist torque at the time of engine start (start assist torque) enabling a proper ignition start as depicted in (a) and (b) of FIG. 8, the crankshaft is less likely to return to the target stop range due to swing-back and it is desirable to set the connection torque smaller within a range capable of overcoming the friction of the direct injection engine to rotate the crankshaft, so as not to pass the target stop range. In the case of a four-, six-, or eight-cylinder engine or a multi-cylinder engine having more cylinders, since the minimum region of the pumping energy is within a range of the expansion stroke (about 0 to 120 degrees), the crankshaft is likely to be returned to the minimum region due to swing-back and fall within the target stop range, and the connection torque can be set larger as compared to the two- and three-cylinder engines.

The control stop position for interrupting the clutch in the third aspect of the invention may be a position at which the crankshaft separates from the crest of the pumping energy, for example, at the crank angle of about 5 to 10 degrees from the compression TDC; the clutch may be interrupted when entering a target stop range enabling a proper ignition start or may be interrupted just before the target stop range and, therefore, various forms are available in consideration of a degree of the connection torque, the friction of the direct injection engine, etc. Although the connection toque is generated only for a constant time in the fourth aspect of the invention, this constant time is a time allowing the rotation to a position at which the crankshaft at least separates from the crest of the pumping energy, for example, at the crank angle of about 5 to 10 degrees from the compression TDC, may be a time until the crankshaft enters the target stop range, and is appropriately defined in consideration of a level of the connection torque, the friction of the direct injection engine, etc. If the crankshaft is less likely to return to the target stop range due to swing-back as in the case of the two- and three-cylinder engines, the control stop position and the constant time are desirably set smaller so as to prevent the crank angle from passing the target stop range. The connection torque, the control stop position, and the constant time are desirably learned and corrected as needed such that the crankshaft stops within the target stop range.

As apparent from (c) of FIG. 8, a four-cylinder engine has a relatively wide minimum region of the pumping energy reaching near 120 degrees, i.e., a boundary of the expansion stroke, and the start assist torque abruptly increases near 120 degrees. Therefore, to prevent the crankshaft from stopping near 120 degrees, as is the case with the two- and three-cylinder engines, the connection torque, the control stop position, and the constant time may be set smaller such that the crank angle of the crankshaft does not pass the minimum region of the pumping energy and stops within a range equal to or less than 110 degrees, for example.

The fifth aspect of the invention is the case that a clutch connection process is executed when the stop position of the crankshaft at the time of engine stop deviates from the predefined target stop range and, since the stop position of the crankshaft is estimated based on a swing-back point, whether the stop position of the crankshaft deviates from the target stop range can promptly be determined; however, when another aspect of the invention is implemented, it may be determined whether the stop position deviates from the target stop range, based on the stop position of the crankshaft when engine rotation actually completely stops. The target stop range is a range of a crank angle enabling a proper ignition start and is desirably a range overlapping with the minimum region of the pumping energy and, as apparent from FIG. 8, in the case of the two- and three-cylinder engines, for example, the range from the compression TDC to about 40 to 100 degrees is appropriate. In the case of the four-cylinder engine, for example, the range from the compression TDC to about 40 to 120 degrees is appropriate; in the case of the six-cylinder engine, for example, the range from the compression TDC to about 40 to 80 degrees is appropriate; and in the case of the eight-cylinder engine, for example, the range from the compression TDC to about 30 to 60 degrees is appropriate. When another aspect of the invention is implemented, for example, if the crankshaft stops on the crest of the pumping energy, i.e., if the crank angle is within about ±10 degrees from the compression TDC, the clutch connection process may be implemented.

In the seventh aspect of the invention, when the clutch is interrupted to stop the direct injection engine, the intake air amount adjustment valve is subjected to opening control; however, this is performed for the purpose of sufficiently sucking air in an intake stroke and compressing the air in a compression stroke to properly acquire the pumping action for a while after engine stop and, even if the intake air amount adjustment valve is kept closed, the pumping action is acquired to some extent based on the intake air and, therefore, when another aspect of the invention is implemented, such opening control of the intake air amount adjustment valve is not necessarily required. Although the intake air amount adjustment valve is desirably subjected to the opening control until the crankshaft substantially stops, for example, until the engine rotation speed reaches zero for the first time, and is desirably subjected to the opening control to be fully opened, the opening time and the opening amount are appropriately defined. An electronic throttle valve and an ISC valve (idle speed control valve) are preferably used for the intake air amount adjustment valve.

First Example

An example of the present invention will now be described in detail with reference to drawings.

FIG. 1 is a diagram of a general configuration including a schematic of a drive system of a hybrid vehicle 10 to which the present invention is preferably applied. The hybrid vehicle 10 includes a direct injection engine 12 directly injecting fuel into a cylinder and a motor generator MG acting as an electric motor and an electric generator, as a drive power source for running. An output of the direct injection engine 12 and the motor generator MG is transmitted from a torque converter 14 that is a hydraulic power transmission device via a turbine shaft 16 and a C1 clutch 18 to an automatic transmission 20 and further transmitted via an output shaft 22 and a differential gear device 24 to left and right drive wheels 26. The torque converter 14 includes a lockup clutch (L/U clutch) 30 directly coupling a pump impeller and a turbine impeller with the pump impeller integrally connected to an oil pump 32 and is mechanically rotationally driven by the direct injection engine 12 and the motor generator MG The motor generator MG corresponds to a rotating machine.

Figure 2:
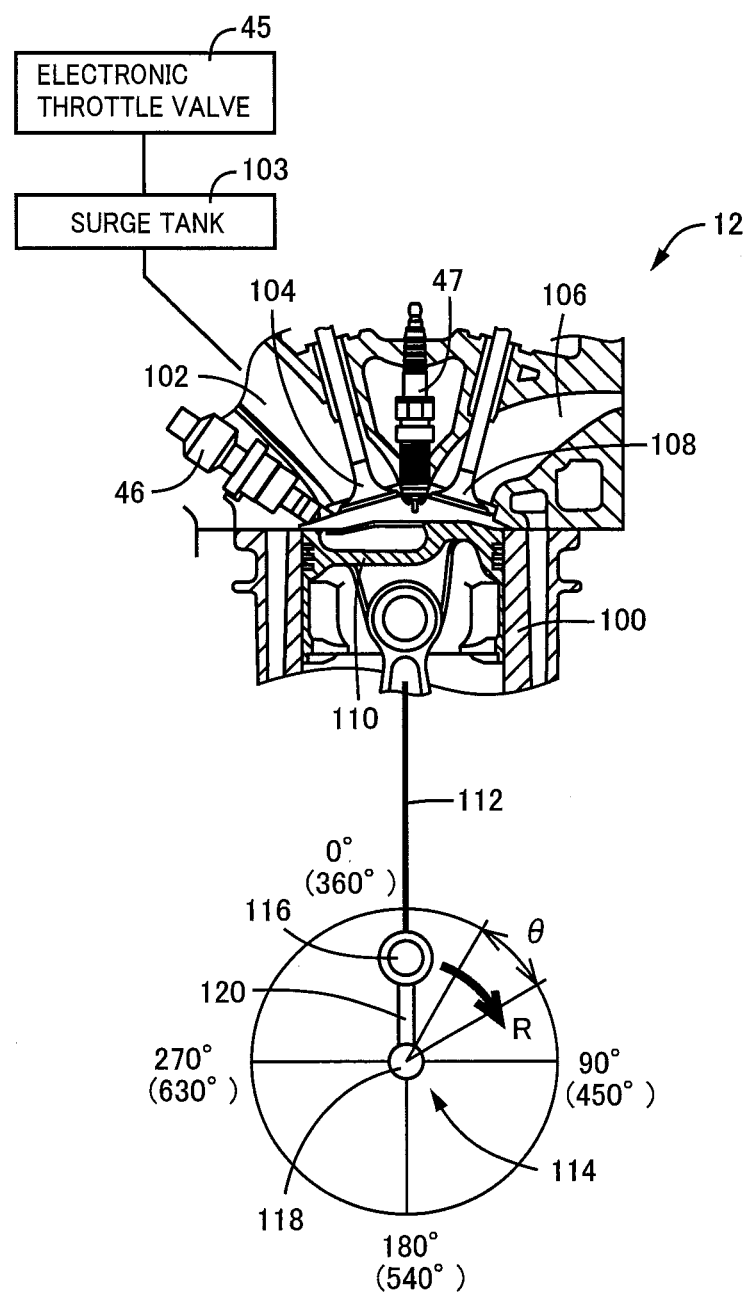
FIG. 2 is a cross sectional view for explaining the direct injection engine of the hybrid vehicle in FIG. 1.

For the direct injection engine 12, an eight-cylinder four-cycle gasoline engine is used in this example and, as specifically depicted in FIG. 2, gasoline (high-pressure particulate) is directly injected by a fuel injection device 46 into a cylinder 100. The direct injection engine 12 allows air to flow from an intake passage 102 via an intake valve 104 into the cylinder 100 and allows exhaust gas to be discharged via an exhaust valve 108 from an exhaust passage 106 and, when ignition is caused by an ignition device 47 at predetermined timing, air-fuel mixture in the cylinder 100 is exploded and combusted to push down a piston 110 to the lower side. The intake passage 102 is connected via a surge tank 103 to an electronic throttle valve 45 acting as an intake air amount adjustment valve so as to control an amount of intake air flowing from the intake passage 102 into the cylinder 100, and thus engine output, in accordance with an opening degree of the electronic throttle valve 45 (throttle valve opening degree). The piston 110 is axially slidably fitted into the cylinder 100 and is relatively rotatably coupled via a connecting rod 112 to a crank pin 116 of a crankshaft 114, and the crankshaft 114 is rotationally driven as indicated by an arrow R in accordance with linear reciprocating movement of the piston 110. The crankshaft 114 is rotatably supported by a bearing in a journal portion 118 and integrally includes a crank arm 120 connecting the journal portion 118 and the crank pin 116.

The direct injection engine 12 as described above performs four strokes, i.e., an intake stroke, a compression stroke, an expansion (explosion) stroke, and an exhaust stroke, per two rotations (720 degrees) of the crankshaft 114 and this is repeated to allow the crankshaft 114 to continuously rotate. The pistons 110 of the eight cylinders 100 are configured to have the respective crank angles shifted by 90 degrees from each other and, in other words, the positions of the crank pins 116 of the crankshafts 114 are projected in directions shifted by 90 degrees from each other and, each time the crankshaft 114 rotates by 90 degrees, the eight cylinders 100 are exploded and combusted in order, thereby continuously generating a rotation torque. When the crankshaft 114 rotates by a predetermined angle from a compression TDC at which the piston 110 reaches the TDC (top dead center) after the compression stroke, and is stopped within a predetermined angle range θ in the expansion stroke with both the intake valve 104 and the exhaust valve 108 closed, gasoline can be injected by the fuel injection device 46 into the cylinder 100 and ignited by the ignition device 47 to perform an ignition start in which the air-fuel mixture in the cylinder 100 is exploded and combusted for a start. If friction of the portions of the direct injection engine 12 is small, the direct injection engine 12 can be started by the ignition start only and, even if the friction is large, the ignition start can reduce a start assist torque at the time of start with cranking of the crankshaft 114 and, therefore, a maximum torque of the motor generator MG generating the assist torque can be reduced to achieve reduction in size and fuel consumption. When the angle range θ is within an appropriate range of, for example, about 30 to 60 degrees, relatively large rotation energy can be acquired from the ignition start to reduce the assist torque.

Returning to FIG. 1, a K0 clutch 34 is disposed between, and directly couples, the direct injection engine 12 and the motor generator MG via a damper 38. The K0 clutch 34 is a single-plate or multi-plate friction clutch frictionally engaged by a hydraulic cylinder and is subjected to engagement/release control by a hydraulic control device 28 and disposed in an oil bath condition within an oil chamber 40 of the torque converter 14 in this example. The K0 clutch 34 is a hydraulic friction engagement device and acts as a connection/disconnection device connecting and disconnecting the direct injection engine 12 to/from a power transmission path. The motor generator MG is connected via an inverter 42 to a battery 44. The automatic transmission 20 is a stepped automatic transmission of planetary gear type etc., having a plurality of gear stages with different gear ratios established depending on engaged/released states of a plurality of hydraulic friction engagement devices (clutches and brakes) and is subjected to shift control by electromagnetic hydraulic control valves, switching valves, etc., disposed in the hydraulic control device 28. The C1 clutch 18 acts as an input clutch of the automatic transmission 20 and is also subjected to engagement/release control by the hydraulic control device 28.

The hybrid vehicle 10 as described above is controlled by an electronic control device 70. The electronic control device 70 includes a so-called microcomputer having a CPU, a ROM, a RAM, an I/O interface, etc., to execute signal processes in accordance with a program stored in advance in the ROM, while utilizing a temporary storage function of the RAM. The electronic control device 70 is supplied with a signal indicative of an operation amount (accelerator operation amount) Acc of an accelerator pedal from an accelerator operation amount sensor 48. The electronic control device 70 is also supplied with signals related to a rotation speed (engine rotation speed) NE of the direct injection engine 12, a rotation speed (MG rotation speed) NMG of the motor generator MG a rotation speed (turbine rotation speed) NT of the turbine shaft 16, a rotation speed (output shaft rotation speed corresponding to vehicle speed V) NOUT of the output shaft 22, and a rotation angle (crank angle) φ from the TDC (top dead center) of each of the eight cylinders 100, from an engine rotation speed sensor 50, an MG rotation speed sensor 52, a turbine rotation speed sensor 54, a vehicle speed sensor 56, and a crank angle sensor 58, respectively. Various pieces of information necessary for various controls are also supplied. The accelerator operation amount Acc corresponds to an output request amount.

The electronic control device 70 functionally includes a hybrid control means 72, a shift control means 74, and an engine stop control means 80. The hybrid control means 72 controls actuations of the direct injection engine 12 and the motor generator MG to switch a plurality of predetermined running modes, such as an engine running mode using only the direct injection engine 12 as the drive power source for running, a motor running mode using only the motor generator MG as the drive power source for running, and an engine+motor running mode using both for running, depending on an operation state such as the accelerator operation amount Acc and the vehicle speed V for running, for example. The shift control means 74 controls the electromagnetic hydraulic control valves, switching valves, etc., disposed in the hydraulic control device 28 to switch the engagement/release state of the plurality of the hydraulic friction engagement devices, thereby switching a plurality of the gear stages of the automatic transmission 20 in accordance with a shift map defined in advance by using operation states such as the accelerator operation amount Acc and the vehicle speed V as parameters.

Figure 3:
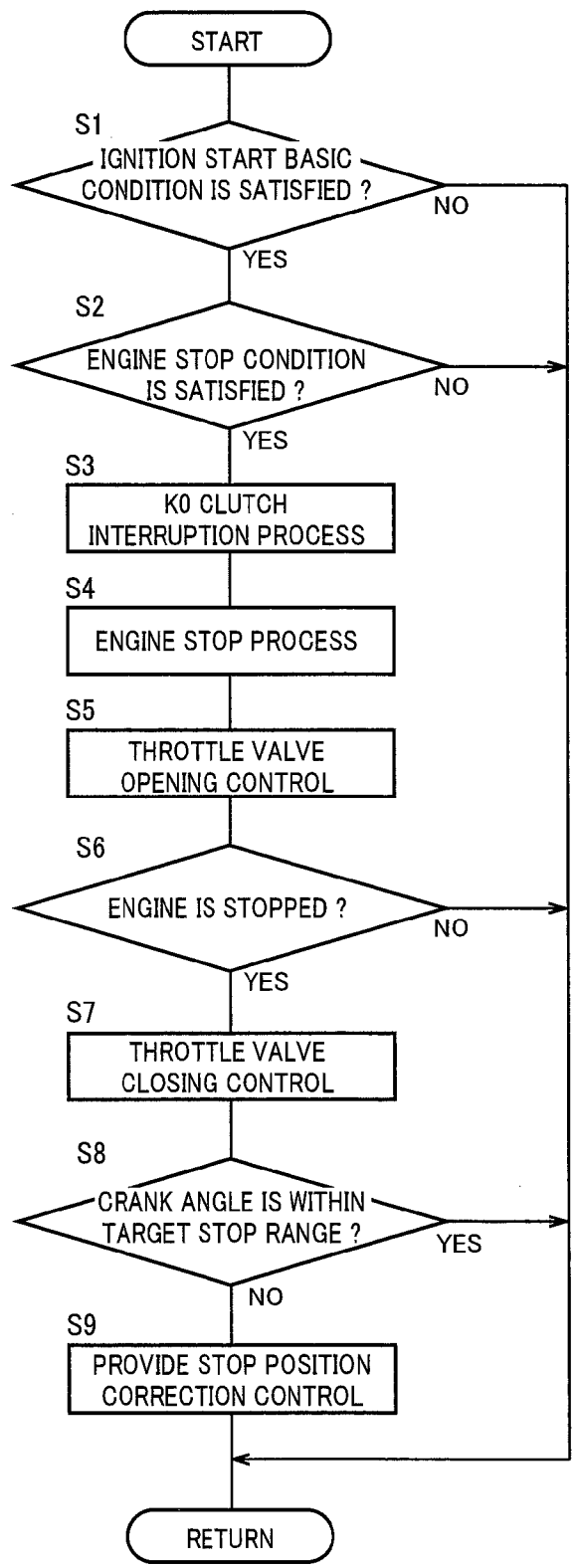
FIG. 3 is a flowchart for specifically explaining an operation of an engine stop control means functionally included in the electronic control device of FIG. 1.
Figure 4:
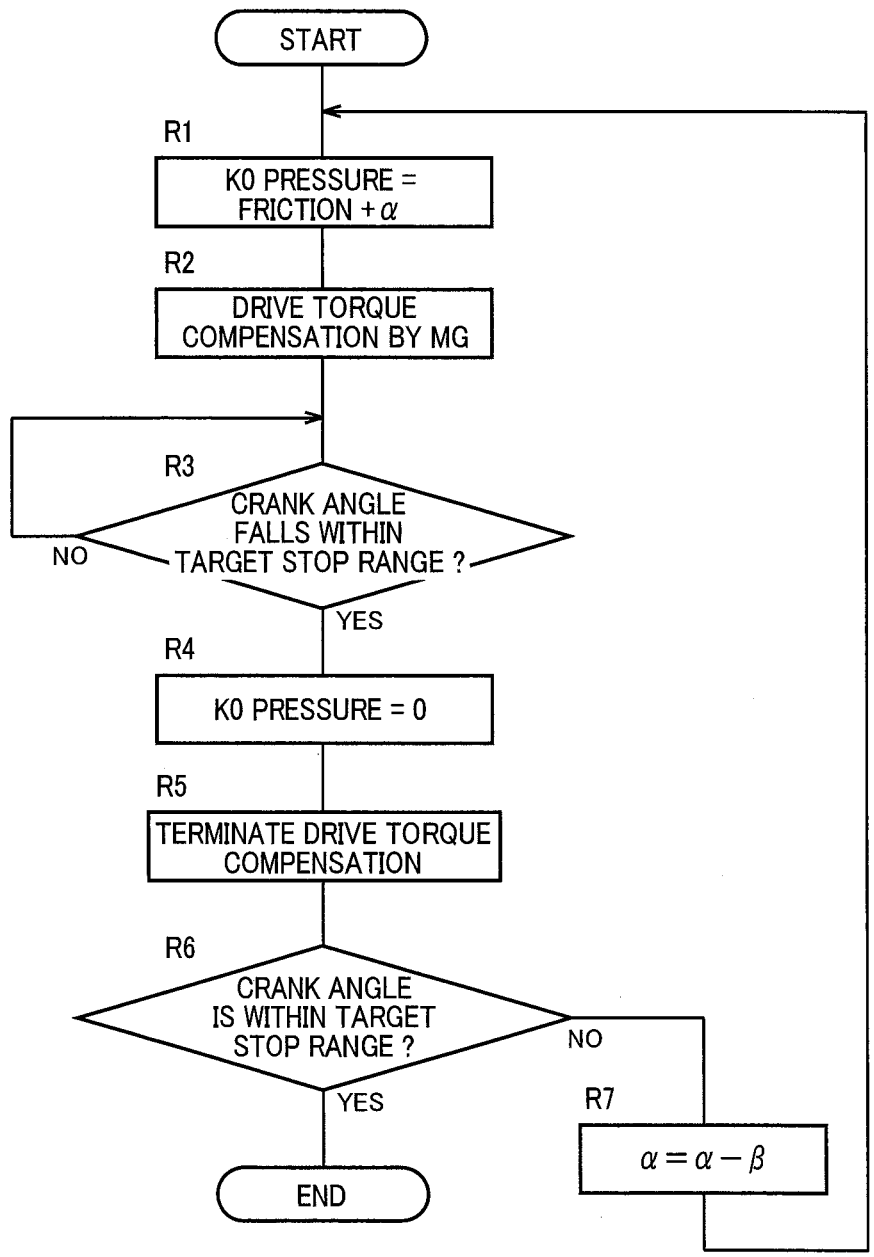
FIG. 4 is a flowchart for specifically explaining stop position correction control of the crankshaft at step S9 of FIG. 3.

The engine stop control means 80 provides control for stopping the direct injection engine 12 at the time of switching from the engine+motor running mode to the motor running mode, at the time of inertia running during the engine+motor running mode or the engine running mode, at the time of deceleration, at the time of vehicle stop, etc., functionally includes an engine stopping means 82, a throttle opening means 84, a crank angle determining means 86, a clutch engaging means 88, and a drive torque compensating means 90, and executes a signal process in accordance with flowcharts of FIGS. 3 and 4. FIG. 4 is a flowchart for specifically explaining stop position correction control of step S9 of FIG. 3. Steps S3 and S4 of FIG. 3 correspond to the engine stopping means 82; steps S5, S6, and S7 correspond to the throttle opening means 84; and step S8 and step R6 of FIG. 4 correspond to the crank angle determining means 86. Steps R1, R3, and R4 of FIG. 4 correspond to the clutch engaging means 88, and steps R2 and R5 correspond to the drive torque compensating means 90. The throttle opening means 84 acts as a valve opening control means providing an opening control of the intake air amount adjustment valve, and the clutch engaging means 88 acts as a connection control means temporarily connecting the K0 clutch 34.

At step S1 of FIG. 3, it is determined whether an ignition start basic condition is satisfied. The ignition start basic condition includes an execution condition of an intermittent operation in which the direct injection engine 12 is turned on (operated) and off (stopped) and an engine cooling water temperature equal to or more than a predetermined temperature, and the determination is made based on whether all the conditions are satisfied. If the ignition start basic condition is satisfied, step S2 is executed to determine whether an engine stop condition is satisfied. The engine stop condition includes the time of switching from the engine+motor running mode to the motor running mode and the time of deceleration during the engine running mode and, if the engine stop condition is satisfied, the engine stop control after step S3 is provided.

Figure 5:
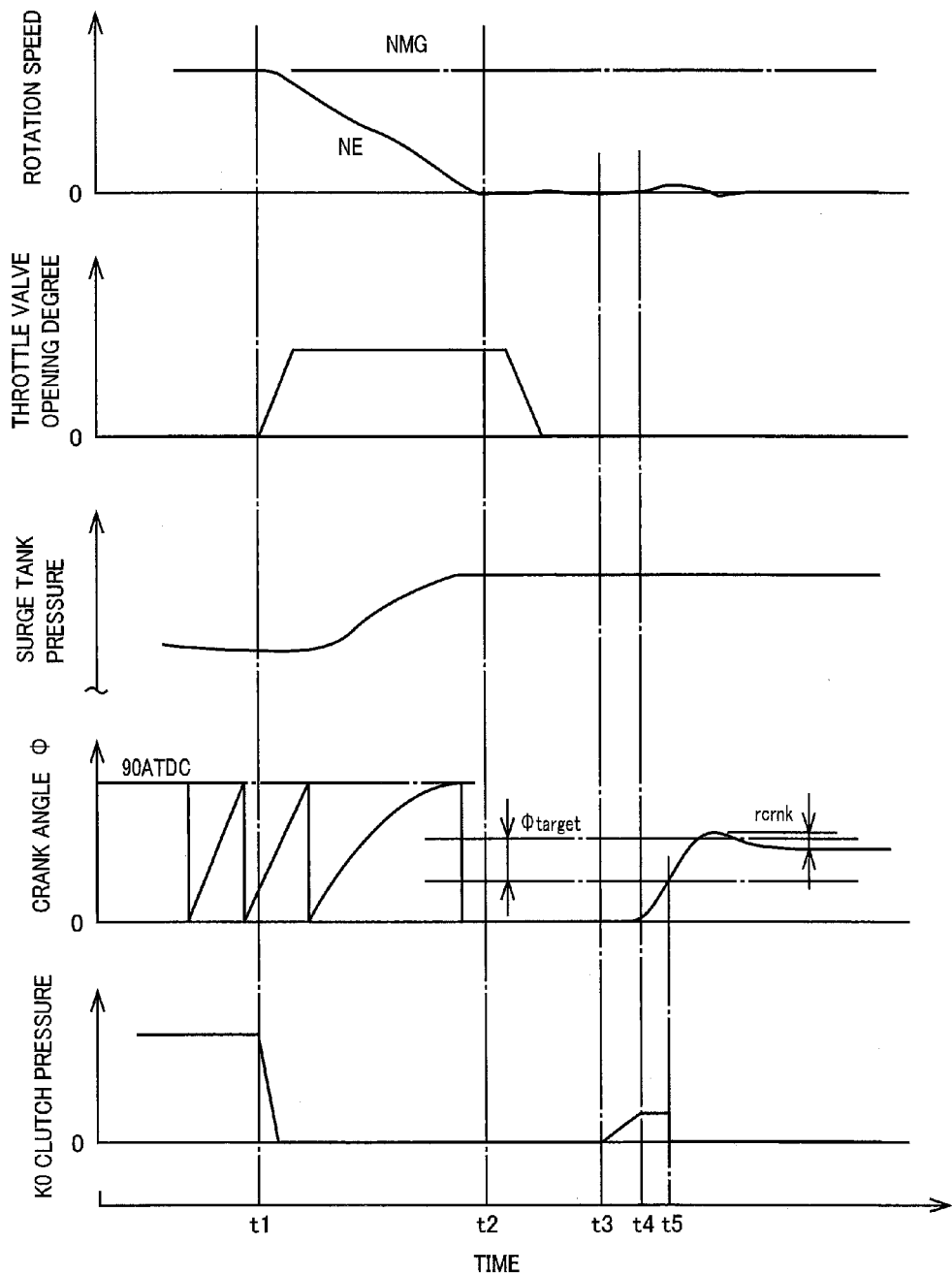
FIG. 5 is an example of a time chart for explaining changes of operation states of portions when the engine stop control is provided in accordance with flowcharts of FIGS. 3 and 4.

Time t1 of a time chart of FIG. 5 is a time when the determination of step S2 is YES (affirmative) and the engine stop control is provided. FIG. 5 is a diagram of changes of operation states of portions when the inertia running with an accelerator turned off is implemented during running in the engine+motor running mode and the engine stop control is provided, and a throttle valve opening degree is an opening degree of the electronic throttle valve 45 of the direct injection engine 12 and is zero (fully closed) at time t1 during the inertia running. A surge tank pressure is a pressure in the surge tank 103 disposed upstream of the intake passage 102 and, since the surge tank 103 is in communication with the air via the electronic throttle valve 45, the surge tank pressure is reduced from the atmospheric pressure at time t1 when the electronic throttle valve 45 is fully closed, due to the air sucking action associated with the rotation of the direct injection engine 12. A crank angle $\phi$ is a chart of changes in the crank angle $\phi$ from the compression TDC to 90 degrees when the compression TDC is zero degrees, and is a chart continuously depicting the crank angle $\phi$ of a plurality of the cylinders 100 reaching the compression TDC at intervals of 90 degrees. A K0 clutch pressure is an engagement oil pressure of the K0 clutch 34 and is set to a maximum pressure (line pressure) at time t1 during running in the engine+motor running mode and the K0 clutch 34 is completely engaged. The K0 clutch pressure corresponds to an engagement torque of the K0 clutch 34, i.e., a connection torque connecting the direct injection engine 12 to the power transmission path.

At step S3 of FIG. 3, an interruption process of the K0 clutch 34 is executed to disconnect the direct injection engine 12 from the power transmission path. In the interruption process of the K0 clutch 34, for example, the K0 clutch pressure is gradually reduced to zero. At step S4, a stop process of the direct injection engine 12 is executed. In this stop process, the fuel injection from the fuel injection device 46 is stopped (fuel cut is performed) and the ignition control of the ignition device 47 is stopped. As a result, also because the direct injection engine 12 is disconnected from the power transmission path at step S3, an engine rotation speed NE is gradually reduced. The interruption process of the K0 clutch 34 of step S3 and the fuel cut, etc., of step S4 may be performed with the fuel cut executed later, may concurrently be performed in parallel, or may be performed with the fuel cut executed first. If the fuel cut is already implemented by accelerator-off etc., the fuel cut may be continued. At next step S5, the electronic throttle valve 45 is subjected to the opening control to a certain amount. This opening control of the electronic throttle valve 45 allows the surge tank 103 to be in communication with the air and the surge tank pressure gradually rises to near the atmospheric pressure. As a result, while the direct injection engine 12 rotates due to inertia, sufficient air flows into the cylinders 100 in the intake stroke.

At step S6, it is determined whether the rotation of the direct injection engine 12 is substantially stopped, specifically, whether the engine rotation speed NE becomes equal to or less than about 100 rpm, for example, and if the direct injection engine 12 is substantially stopped, the electronic throttle valve 45 is subjected to a closing control at step S7. Time t2 of FIG. 5 is a time when the stop determination of the direct injection engine 12 is made, i.e., a time when the determination of step S6 turns to YES. Although the closing control of the electronic throttle valve 45 at step S7 may immediately be implemented, the closing control is implemented after a certain delay time such that the closing control is provided after the rotation of the direct injection engine 12 is completely stopped. The complete stop of the rotation of the direct injection engine 12 may be confirmed before the electronic throttle valve 45 is subjected to the closing control.

Figure 6:
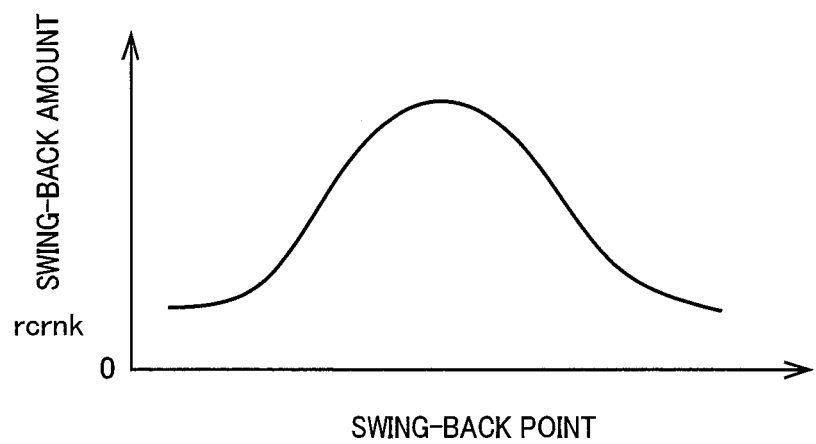
FIG. 6 is a diagram depicting an example of a map obtaining a swing-back amount based on a swing-back point at step S8 of FIG. 3 and step R6 of FIG. 4.

At step S8, it is determined whether a stop crank angle $\phi$stop at the time of stop of the rotation of the direct injection engine 12 is within a range of a predefined target stop range $\phi$target and if the angle is within the range of the target stop range $\phi$target, a series of the engine stop control is directly terminated or if the angle is out of the target stop range $\phi$target, a stop position correction control of step S9 is provided. The stop crank angle $\phi$stop in this case is determined for the cylinders 100 within a range of the compression TDC≤$\phi$stop≤the compression TDC+90 degrees, for example. Although the stop crank angle $\phi$stop may be the crank angle $\phi$ after the rotation of the direct injection engine 12 completely stops, the determination is made in this example by obtaining a swing-back amount rcrnk from a predefined map as depicted in FIG. 6 based on a swing-back point of the crankshaft 114, i.e., the crank angle $\phi$ when the engine rotation speed NE turns to zero for the first time, and by using an estimated stop crank angle $\phi$est acquired by subtracting the swing-back amount rcrnk. This enables prompt determination on whether the stop crank angle $\phi$stop (strictly, the estimated stop crank angle $\phi$est) at the time of stop of the rotation of the direct injection engine 12 is deviated from the target stop range $\phi$target so as to promptly provide the stop position correction control of step S9. The stop position correction control of step S9 utilizes a pumping action (air spring) due to the compression of air in the cylinder 100 to adjust the crank angle $\phi$ and, if the air in the cylinder 100 leaks from the sealing etc., of the piston 110 and the pressure decreases, the desired pumping action cannot be acquired and, therefore, the stop position correction control is provided as early as possible within a time when the pumping action is acquired.

The target stop range $\phi$target is a range of the crank angle $\phi$ enabling a proper ignition start and is a range overlapping with a minimum region of a pumping energy and, in this example using an eight-cylinder engine equipped as the direct injection engine 12, for example, the target stop range $\phi$target is defined as a range from the compression TDC to 30 to 60 degrees because of characteristics of the pumping energy and the start assist torque depicted in (e) of FIG. 8. In the time chart of FIG. 5, the stop crank angle $\phi$stop at time t2 is substantially zero degrees and is deviated from the target stop range $\phi$target. The swing-back amount rcrnk at the swing-back point of substantially zero degrees (compression TDC) is substantially zero degrees, and the stop crank angle $\phi$stop the estimated stop crank angle $\phi$est≈zero degrees (compression TDC) is satisfied.

The target stop range $\phi$target differs depending on the number of cylinders and, in the case of the two- and three-cylinder engines, for example, a range from the compression TDC to about 40 to 100 degrees is appropriate because of characteristics depicted in (a) and (b) of FIG. 8.

In the case of the four-cylinder engine, a range from the compression TDC to about 40 to 120 degrees is appropriate because of characteristics depicted in (c) of FIG. 8, and in the case of the six-cylinder engine, a range from the compression TDC to about 40 to 80 degrees is appropriate because of the characteristics depicted in (d) of FIG. 8. However, in the case of the multi-cylinder engines having four or more cylinders, since the pumping action (air spring) causes an automatic stop in a bottom portion except the peak of the pumping energy and the start assist torque can be reduced to some extent in the bottom portion, the target stop range φtarget may be set larger such that the stop in the bottom portion is completely included.

Figure 7:
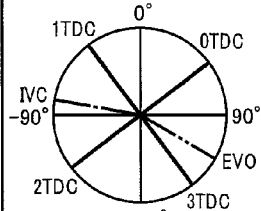
FIG. 7 is a diagram depicting an example of a stop position of the crankshaft at which the ignition start cannot be performed and a stop position of the crankshaft at which the ignition start can be performed in the direct injection engine having each number of cylinders.
Figure 7:
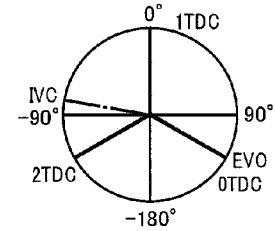
Figure 7:
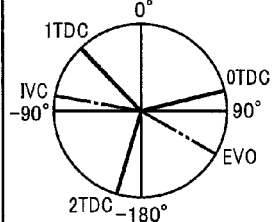
Figure 7:
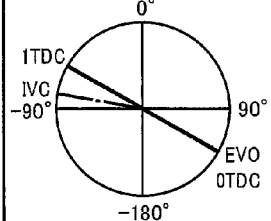
Figure 7:
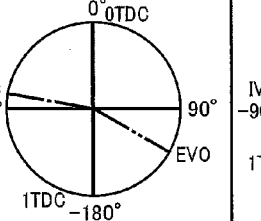
Figure 7:
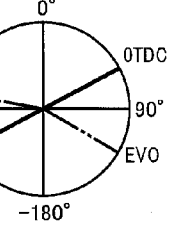
Figure 7:
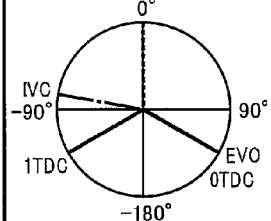
Figure 7:
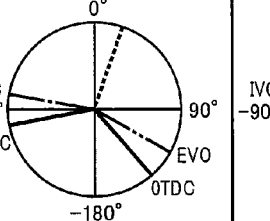
Figure 7:
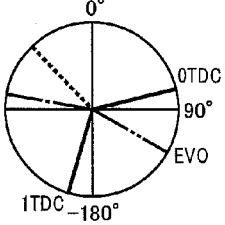
Figure 7:
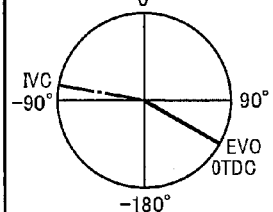
Figure 7:
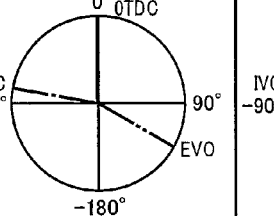
Figure 7:
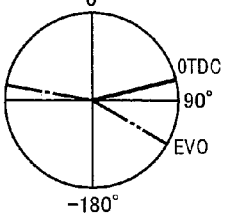
Figure 8A:
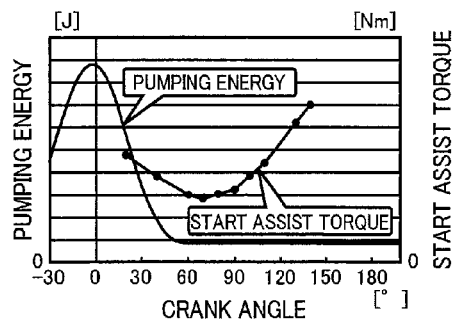
FIG. 8 is a diagram showing a result of a calculated relationship of a crank angle in the expansion stroke (0 degrees=compression TDC) to the potential energy due to pumping (pumping energy) and the assist torque required at the time of start in the direct injection engine having each number of cylinders.
Figure 8B:
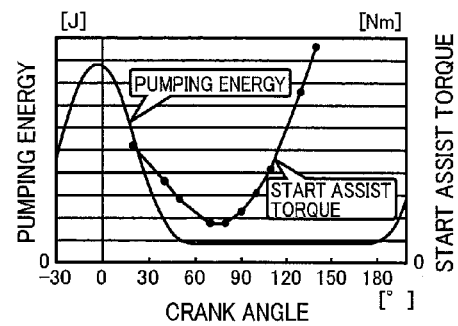
Figure 8C:
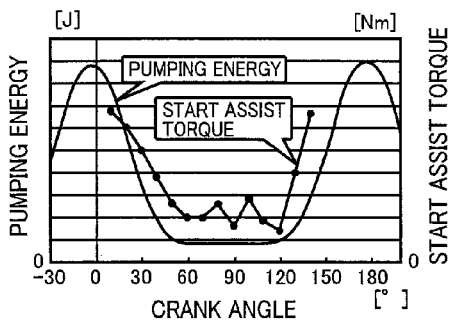
Figure 8D:
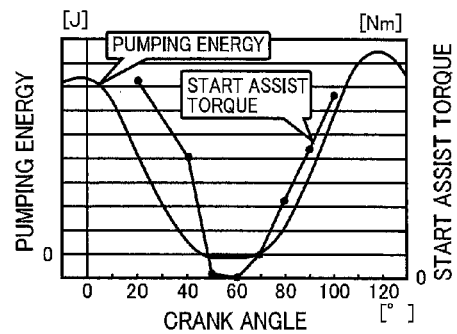
Figure 8E:
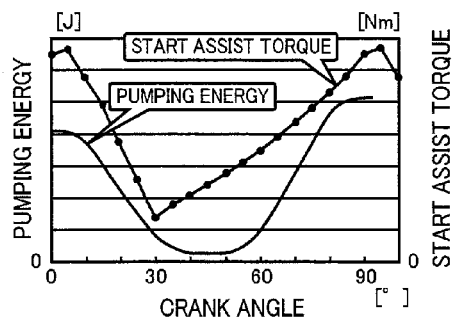

The pumping energy is potential energy due to the action of the air spring generated by compressing the air sucked into the cylinder 100 in the compression stroke and, in the case of the eight-cylinder engine, the pumping energy is a result when pumping energy at the crank angle φ of a zeroth cylinder 100 from zero degrees (compression TDC) to 90 degrees was obtained by calculation on the basis that sufficient air flows into the cylinders 100 due to the atmospheric pressure because of the opening control of the electronic throttle valve 45 with consideration given to compression and expansion of air in the zeroth cylinder 100 at a crank position indicated by 0TDC located in the expansion stroke as depicted in FIG. 7 as well as a first cylinder 100 at a crank position indicated by 1TDC delayed by 90 degrees, and a second cylinder 100 at a crank position indicated by 2TDC further delayed by 90 degrees. Although the pumping energy was obtained by calculation for the two-, three-, four-, and six-cylinder engines as is the case with the eight-cylinder engine, since the six-cylinder engine has the crank angles φ of the cylinders 100 shifted by 120 degrees from each other, the first cylinder 100 and the second cylinder 100 at the crank positions indicted by 1TDC and 2TDC, respectively, are also involved in the compression stroke as depicted in FIG. 7, and the calculation was performed with consideration given to compression and expansion of air in the three zeroth to second cylinders 100 as is the case with the eight-cylinder engine. In the case of the four-cylinder engine, since the crank angles q of the cylinders are shifted by 180 degrees from each other, the first cylinder 100 at the crank position indicated by 1TDC is involved in the compression stroke while the second or later cylinder 100 is not involved with the compression stroke as depicted in FIG. 7, the calculation was performed with consideration given to compression and expansion of air in the two zeroth and first cylinders 100. In the case of the three-cylinder engine, since the crank angles φ of the cylinders are shifted by 240 degrees from each other, the first cylinder 100 at the crank position indicated by 1TDC is involved in the compression stroke while the second or later cylinder 100 is not involved with the compression stroke as depicted in FIG. 7, and the calculation was performed with consideration given to compression and expansion of air in the two zeroth and first cylinders 100 as is the case with the four-cylinder engine. In the case of the two-cylinder engine, since the crank angles φ of a pair of the cylinders are shifted by 360 degrees and located at the same position, only the pressure in the zeroth cylinder 100 at the crank position indicated by 0TDC is involved in the pumping energy, and the calculation was performed with consideration given to compression and expansion of air in the one zeroth cylinder 100. In FIG. 7, 0TDC is a crank position related to the cylinder 100 having the crank angle φ of zero degrees (compression TDC) or exceeding zero degrees and the crank positions of the cylinders 100 subsequent to the cylinder 100 are indicated by 1TDC, 2TDC, 3TDC, etc., in order. A broken line depicted in a field of the three-cylinder engine represents a crank position of the cylinder 100 delayed by one rotation (360 degrees) or more. "EVO" denotes an opening position of the exhaust valve 108 and "IVC" denotes a closing position of the intake valve 104.

The start assist torque of FIG. 8 is an assist torque required when the direct injection engine 12 is started by the ignition start. Engine energy of the direct injection engine 12 is energy acquired by subtracting compression energy due to compression of the subsequent cylinders 100, internal energy of heat, exhaust air, etc., and friction of the portions from the expansion energy acquired by the ignition start as represented by the following Equation (1), and if this engine energy is positive, the assist torque is not required and, if the engine energy is negative, a negative portion corresponds to the start assist torque required for start of the direct injection engine 12. In this case, since it is considered that the stable operation state is achieved if the compressing TDC is reached by the cylinders 100 entering the compression stroke before the zeroth cylinder 100 passes through the expansion stroke, the start assist torque was calculated for the eight- and six-cylinder engines by obtaining the energy until the second cylinder 100 reaches the compression TDC by integration. For the four- and three-cylinder engines, the start assist torque was calculated by obtaining the energy until the first cylinder 100 reaches the compression TDC by integration. For the two-cylinder engine, none of the cylinders 100 enters the compression stroke until the zeroth cylinder 100 passes through the expansion stroke; however, at least the next cylinder 100, i.e., the first cylinder 100 must reach the compression TDC so as to confirm the stable operation state and, therefore, the start assist torque was calculated by obtaining the energy until the first cylinder 100 reaches the compression TDC by integration. The compression energy of Equation (1) corresponds to the pumping energy.

$$\text{Engine Energy=Expansion Energy−Compression Energy−Internal Energy−Friction} \qquad (1)$$

The pumping energy and the start assist torque can finely be obtained by giving consideration to compression, expansion, discharge, etc., of air in all the cylinders 100, for example, and are considered to have general tendencies as depicted in FIG. 8 although specific numeric values are changed depending on the specifications of the portions of the direct injection engine 12, the opening/closing timing of the intake valve 104 and the exhaust valve 108, etc. Therefore, in the case of the eight-, four-, and six-cylinder engines of this example, the stop crank angle φstop at the time of engine stop normally enters the minimum region of the pumping energy and falls within the range of the target stop range φtarget; however, in some cases (e.g., at about 10%), the crankshaft 114 stops near the peak of the pumping energy in the vicinity of the crank angle φ of zero degrees, i.e., the compression TDC, due to a balance in the rotation direction and the friction. The stop position correction control of step S9 is for the purpose of rotating the crankshaft 114 stopped near the compression TDC in this way from near the peak of the pumping energy to the minimum region.

Also in the case of the two- and three-cylinder engines, the stop crank angle φstop at the time of engine stop normally enters the minimum region of the pumping energy and, in some cases (e.g., at about 10%), the crankshaft 114 stops near the peak of the pumping energy in the vicinity of the crank angle φ of zero degrees, i.e., the compression TDC, due to a balance in the rotation direction and the friction. Therefore, if the crankshaft 114 stopped near the compression TDC in this way is rotated by the stop position correction control of step S9 from near the peak of the pumping energy to the minimum region, the crank angle φ can be put into the range of the target stop range φtarget. However, as apparent from (a) and (b) of FIG. 8, since the minimum region of the pumping energy is larger than the expansion stroke (about 0 to 120 degrees) and exceeds the target stop range φtarget with a lower start assist torque enabling the proper ignition start, the stop position correction control of step S9 must be provided so as not to pass the target stop range φtarget. Even when the first stop position, i.e., the stop crank angle φstop, is in the minimum region of the pumping energy, if the target stop range φtarget has been passed, the position cannot be returned to the target stop range φtarget. Therefore, in this case, for example, as in step R7-2 of FIG. 10, the assist torque for starting the direct injection engine 12 may be increased larger than a standard value so that the direct injection engine 12 can certainly be started.

FIG. 7 exemplarily depicts a stop position (stop crank angle φstop) of the crankshaft 114 at which the ignition start cannot be performed and a stop position (stop crank angle φstop) of the crankshaft 114 at which the ignition start can be performed in the direct injection engine 12 having each number of cylinders based on the characteristics of FIG. 8. In the case of the eight-cylinder engine, since the crank angles φ of a plurality of the cylinders 100 are shifted by 90 degrees from each other, at least one crank shaft 114 of the cylinders 100 falls within a range of zero degrees (compression TDC)<φstop<EVO enabling the ignition start and the ignition start can be performed regardless of the stop position of the crankshaft 114. In the case of the six-cylinder engine, since the crank angles φ of the plurality of the cylinders 100 are shifted by 120 degrees from each other, if the stop crank angle φstop of the cylinder 100 of 0TDC is zero degrees, i.e., at the compression TDC, as indicated by an non-ignitable stop position example, the cylinder 100 enabling the ignition start within zero degrees (compression TDC)<φstop<EVO does not exist and the ignition start cannot be performed and, in the other cases, the ignition start can be performed. In the cases of the four-, three-, and two-cylinder engines, an angle area without the cylinder 100 enabling the ignition start within zero degrees (compression TDC)<φstop<EVO exists as indicated by the non-ignitable stop position examples in each case and the ignition start can be performed if the stop crank angle φstop of any of the cylinders 100 satisfies zero degrees (compression TDC) <φstop<EVO.

The stop position correction control of step S9 of FIG. 3 is provided in accordance with the flowchart of FIG. 4. At step R1 of FIG. 4, the engagement oil pressure of the K0 clutch 34 interrupted (released) at step S3 is gradually raised to an oil pressure at which an engagement torque is acquired that is larger than the friction of the direct injection engine 12 by a predefined margin value α. Time t3 of FIG. 5 is a time when the clutch engagement control of step R1 is started, and the K0 clutch pressure is gradually raised and reaches the engagement torque of the friction+α at time t4. When the engagement torque of the K0 clutch 34 reaches the friction+α, the crankshaft 114 of the direct injection engine 12 is rotated against the friction. The margin value α may be defined as a constant value in advance in consideration of a compression resistance etc., of the next cylinder 100 or may be defined as a different value by using the vehicle speed V etc., as a parameter. The margin value α may be learned and corrected based on the rotation state (such as rotation speed and rotation start oil pressure) of the crankshaft 114 in consideration of an individual difference and aging of the friction.

At next step R2, to prevent the drive torque from varying because of rotation resistance associated with the rotation of the crankshaft 114 due to the engagement of the K0 clutch 34, a torque (MG torque) TMG of the motor generator MG is increased in accordance with the engagement toque of the K0 clutch 34. However, as in the case of a high gear stage of the automatic transmission 20, if an increase width of the MG torque TMG is equal to or less than a predetermined allowable value and almost no vehicle shock is generated, the crankshaft 114 may be rotated by inertia energy of the vehicle without increasing the MG torque TMG and, in this case, the consumption of the battery 44 is reduced, resulting in an improvement in fuel efficiency.

At step R3, it is determined whether the crank angle φ of the crank shaft 114 falls within the range of the target stop range φtarget and if the crank angle φ falls within the range of the target stop range φtarget, steps R4 and later are executed. Time t5 of FIG. 5 is a time when the crank angle φ falls within the range of the target stop range φtarget and the determination of step R3 turns to YES, and a lower limit value of the target stop range φtarget corresponds to the control stop position. At step R4, the K0 clutch pressure is immediately set to zero to promptly interrupt (release) the K0 clutch 34 and, at step R5, the drive torque compensation control (increment control of the MG torque TMG) by the motor generator MG is terminated in accordance with the interruption of the K0 clutch 34. At step R6, it is determined whether the stop crank angle φstop at the time of stop of the rotation of the direct injection engine 12 is within a range of the predefined target stop range φtarget as is the case with step S8 and, if the angle is within the range of the target stop range φtarget, a series of the stop position correction control is terminated, or if the angle is out of the target stop range φtarget, step R7 is executed. Although the stop crank angle φstop in this case may be the crank angle φ after the rotation of the direct injection engine 12 completely stops, the determination is made in this example by obtaining a swing-back amount rcrnk from the predefined map as depicted in FIG. 6 based on a swing-back point of the crankshaft 114 and by using the estimated stop crank angle φest acquired by subtracting the swing-back amount rcrnk. FIG. 5 depicts the case that the crankshaft 114 stops within the range of the target stop range φtarget as a result of swing-back and, in this case, the determination of step R6 is YES and a series of the stop position correction control is terminated.

In the case of the two- and three-cylinder engines, since the crankshaft 114 is less likely to return into the range of the target stop range φtarget as a result of swing-back, a control stop position is set, for example, in front of the target stop range φtarget, i.e., on the compression TDC side, so as not to pass the target stop range φtarget and, when the crank angle φ reaches the control stop position, steps R4 and later are executed to terminate the engagement control of the K0 clutch 34. Also in the case of an engine with four or more cylinders including the eight-cylinder direct injection engine 12 of this example, a control stop position may be set in front of the target stop range φtarget so as not to pass the target stop range φtarget and, when the crank angle φ reaches the control stop position, the engagement control of the K0 clutch 34 may be terminated.

If the determination at step R6 is NO (negative), the margin value α is reduced by a predetermined subtraction value β at step R7 and steps R1 and later are subsequently repeated. When the determination of step R6 is NO, this is the case that the crankshaft 114 stops out of the target stop range φtarget, or specifically, the crank angle φ passes the minimum region of the pumping energy and rotates to and just stops near the peak of the next crest, and since the rotation assist of the crankshaft 114 by the engagement control of the K0 clutch 34 is too large, the margin value α is reduced and steps R1 and later are executed again. At steps R3 and R6, a determination is made based on the crank angle γ of the next cylinder 100 delayed by 90 degrees and, if the determination of step R6 turns to YES, a series of the stop position correction control is terminated. However, if the air in the cylinder 100 leaks from the sealing etc., of the piston 110 and the pressure decreases, the desired pumping action cannot be acquired and the correction control of the crank angle φ is no longer properly provided and, therefore, if the determination of step R6 is NO after a predetermined number of times or for a predetermined period of time of execution, the stop position correction control of steps R1 and later is terminated and, for example, as in step R7-2 of FIG. 9, the assist torque for starting the direct injection engine 12 may be increased larger than a standard value such that the direct injection engine 12 can certainly be started.

As described above, in the engine stop control device of the hybrid vehicle 10 of this example, when the direct injection engine 12 is stopped during vehicle running, if the stop crank angle φstop or the estimated stop crank angle φest is out of a range of the target stop range φtarget, the once interrupted K0 clutch 34 is temporarily frictionally engaged to slightly rotate the crankshaft 114 and, therefore, the crankshaft 114 stopped near the compression TDC is rotated to and stopped in the minimum region of the bottom of the pumping energy. In particular, since the pumping action due to compression of air in the cylinder 100 can be acquired at the time of engine stop or immediately after the stop, if the crankshaft 114 is rotated by a predetermined angle from near the compression TDC located on the crest of the pumping energy, the crankshaft 114 can automatically be stopped in the minimum region associated with a low pumping energy. Since the crank angle φ of the low pumping energy overlaps with a range of the crank angle φ suitable for the ignition start associated with a relatively small assist torque for cranking at the time of engine start, i.e., the target stop range φtarget, the ignition start can properly be performed at the next engine start and the assist torque at the time of engine start can be reduced.

In this example, since the friction engagement process of the K0 clutch 34, i.e., the stop position correction control of FIG. 4, is executed within a time when the pumping action is acquired from the compression of air in the cylinder 100, the crankshaft 114 is automatically stopped in the minimum region associated with a low pumping energy and the ignition start can properly be performed at the next engine start. In particular, although the air in the cylinder 100 leaks out from the sealing etc., of the piston 110 and the pumping action is reduced over time, since the electronic throttle valve 45 is subjected to the opening control at the time of stop of the direct injection engine 12 until the rotation of the crankshaft 114 stops in this example, sufficient air is sucked into the cylinder 100 and the pumping action is properly acquired for a relatively long time and, since the stop position correction control is provided immediately after the stop of the direct injection engine 12, the crankshaft 114 is properly stopped within the range of the target stop range φtarget due to the pumping action.

In this example, since the friction engagement process of the K0 clutch 34, i.e., the stop position correction control of FIG. 4 is provided such that at least one of a plurality of the cylinders 100 of the direct injection engine 12 is in the expansion stroke and that the crankshaft 114 stops in the target stop range φtarget suitable for the ignition start, the ignition start can properly be performed at the next engine start. In particular, since the engagement torque (friction+α) is generated that can overcome the friction of the direct injection engine 12 to rotate the crankshaft 114, and the K0 clutch 34 is immediately interrupted when the crank angle φ exceeds a predetermined control stop position (the lower limit value of the target stop range φtarget), the crankshaft 114 can be rotated from near the compression TDC and can be stopped in the target stop range φtarget suitable for the ignition start in combination with the pumping action.

In this example, if the stop position of the crankshaft 114 at the time of engine stop is deviated from the predefined target stop range φtarget, the stop position correction control of FIG. 4 is implemented and, since the stop position of the crankshaft 114 is estimated based on the swing-back point of the crankshaft 114 to determine whether the deviation from the target stop range φtarget exists by using the estimated stop crank angle (φest, the determination can promptly be made and the stop position correction control of FIG. 4 can properly be provided within a time when the pumping action is acquired.

Since the eight-cylinder four-cycle gasoline engine is used as the direct injection engine 12 in this example and the minimum region defined as the bottom of the pumping energy exists within the range of the expansion stroke (about 0 to 120 degrees) as depicted in (e) of FIG. 8, the crankshaft 114 is properly stopped in the minimum region of the pumping energy by the stop position correction control of FIG. 4 as a result of swing-back etc., and the start assist torque can properly be reduced by the ignition start. The direct injection engines having the number of cylinders equal to or greater than four have the minimum region of the pumping energy within the range of the expansion stroke (about 0 to 120 degrees), the same action effect is acquired.

When the K0 clutch 34 is temporarily engaged to rotate the crankshaft 114 in this example, the torque TMG of the motor generator MG is increased as needed in accordance with the engagement torque of the K0 clutch 34, a shock such as drive torque variation due to rotation resistance of the crankshaft 114 can properly be suppressed.

Second Example

Another example of the present invention will be described. In the following description, the portions substantially common with the example are denoted by the same reference numerals and will not be described in detail.

Figure 9:
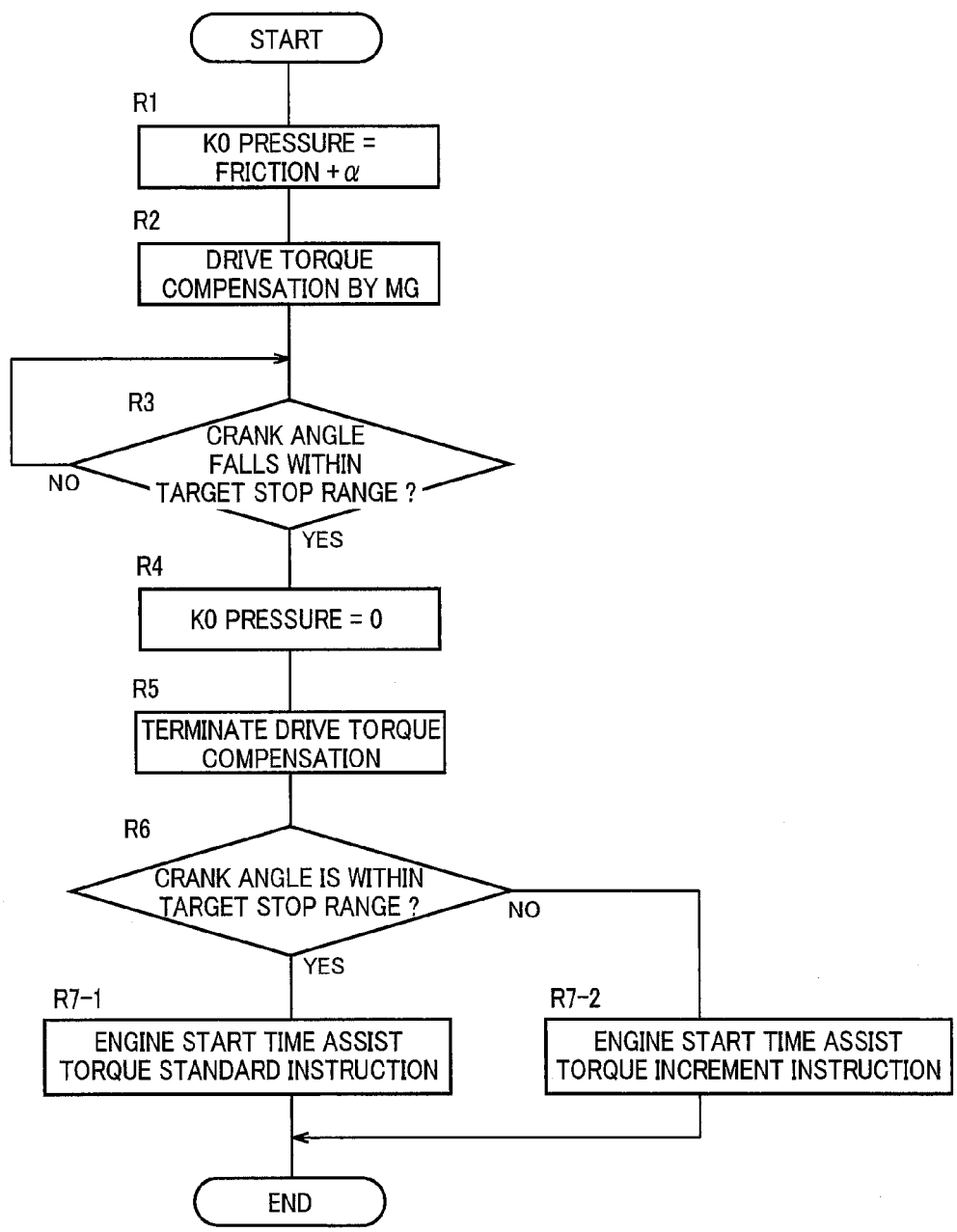
FIG. 9 is a diagram for explaining another example of the present invention and a flowchart used instead of FIG. 4.

FIG. 9 is a flowchart used instead of FIG. 4 and a difference exists in a process after determining whether the stop crank angle φstop (including the estimated stop crank angle φest) at the time of stop of rotation of the direct injection engine 12 is within a range of the predefined target stop range φtarget at step R6. In particular, if the stop crank angle φstop is within the range of the target stop range φtarget and the determination of step R6 is YES, an instruction is output for using a standard value as an assist torque for cranking at the next engine start at step R7-1 and, if the stop crank angle φstop is out of the range of the target stop range φtarget and the determination of step R6 is NO, an increment instruction is output for making the assist torque for cranking at the next engine start larger than the standard value at step R7-2. The instruction for the standard value and the increment instruction are output to an engine start means etc., functionally included by the hybrid control means 72 and, as a result, the next engine start is always properly performed with a suitable level of the assist torque regardless of whether the crankshaft 114 is within the range of the target stop range φtarget.

Although the standard value may be set to a constant value enabling a proper start using the ignition start when the crankshaft 114 is stopped within the range of the target stop range φtarget, the start assist torque differs depending on the crank angle φ as apparent from FIG. 8, the standard value may be defined by using the crank angle φ of the crankshaft 114 as a parameter. The assist torque corresponding to the increment instruction may be defined in advance as a predefined constant assist torque because the crankshaft 114 is basically located at the compression TDC.

Third Example

Figure 10:
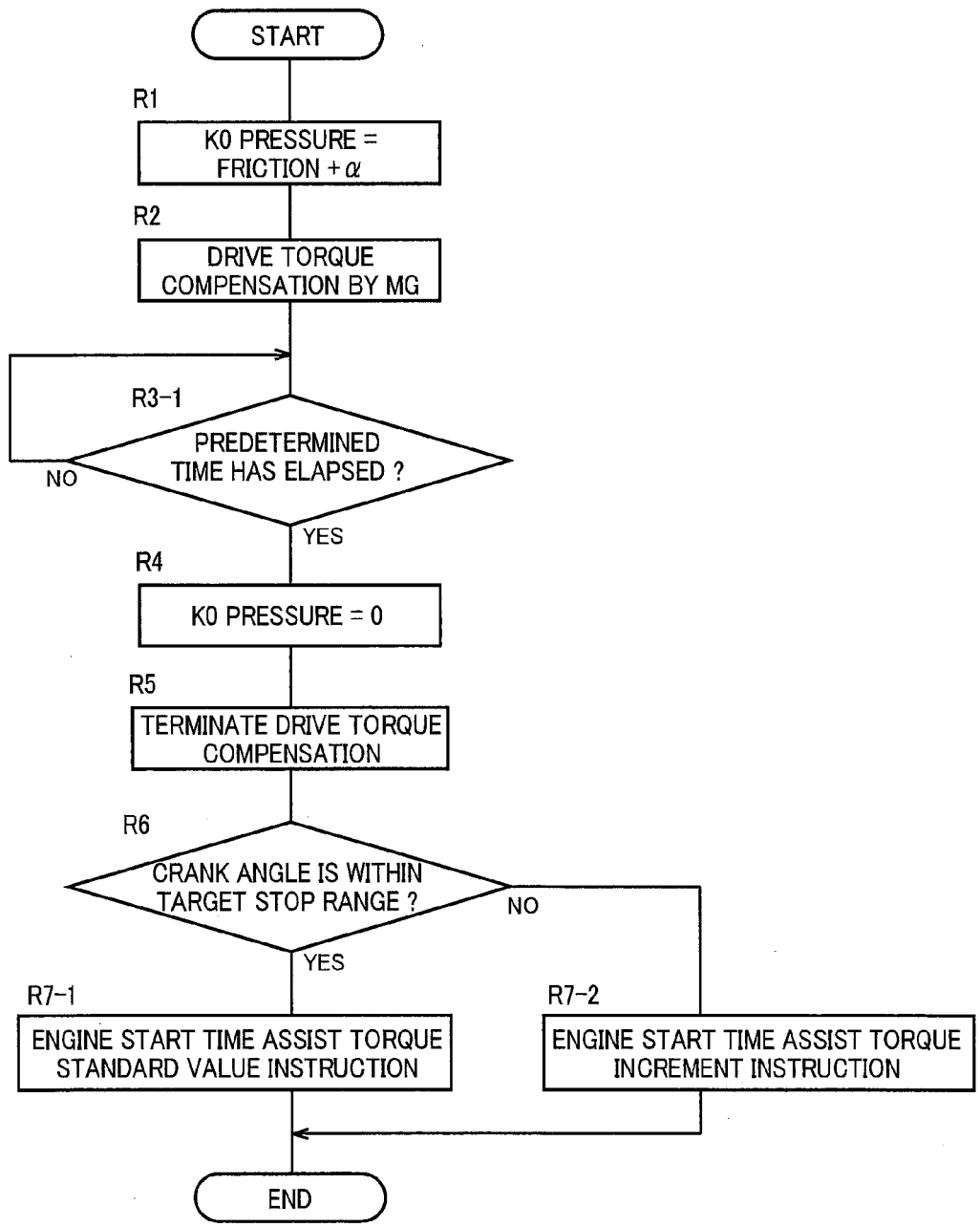
FIG. 10 is a diagram for explaining yet another example of the present invention and a flowchart used instead of FIG. 4.

FIG. 10 is a diagram for explaining yet another example and a difference exists in an engagement process of the K0 clutch 34 as compared to the example of FIG. 9. In the examples of FIGS. 4 and 9, it is determined at step R3 whether the crank angle φ falls within the range of the target stop range φtarget, and when the crank angle φ falls within the range of the target stop range φtarget, steps R4 and later are executed; however, in FIG. 10, step R3-1 is provided instead of step R3 to determine whether a predetermined time defined in advance has elapsed and, if the predetermined time has elapsed, steps R4 and later are executed to interrupt the K0 clutch 34. With regard to this predetermined time, on the assumption that the crankshaft 114 is stopped near the compression TDC, a constant time is defined in advance such that the crankshaft 114 can be rotated against the friction etc., into the minimum region of the pumping energy, with consideration given to the K0 clutch pressure etc. Therefore, also in this example, the crankshaft 114 can be rotated from near the compression TDC and can be stopped within the range of the target stop range φtarget in combination with the pumping action, and the same action effect as the example is acquired such as a proper ignition start at the next engine start and a reduction in the assist torque.

Since the direct injection engine 12 having four or more cylinders has the minimum region of the pumping energy substantially coincident with the target stop range φtarget and is returned to the target stop range φtarget by swing-back of the rotation of the crankshaft 114, the constant time can be set to a relatively longer time such that the crankshaft 114 can certainly be separated from near the compression TDC. In the case of the two- and three-cylinder engines, since the minimum region of the pumping energy exceeds the target stop range φtarget, the crankshaft 114 is less likely to return to the target stop range φtarget due to swing-back, the constant time is set to a relatively shorter time so as not to pass the target stop range φtarget. The constant time can also be learned and corrected such that the crankshaft 114 stops within the range of the target stop range φtarget. In a flowchart of FIG. 10, as is the case with FIG. 9, if the stop crank angle φstop is out of the range of the target stop range φtarget, the increment instruction for the assist torque is output at step R7-2 and, therefore, even if the crank angle φ passes the target stop range φtarget in the two- or three-cylinder engine, the next engine start can properly be performed with a suitable level of the assist torque.

In the example of FIG. 4, step R3-1 of FIG. 10 may be executed instead of step R3.

Fourth Example

Figure 11:
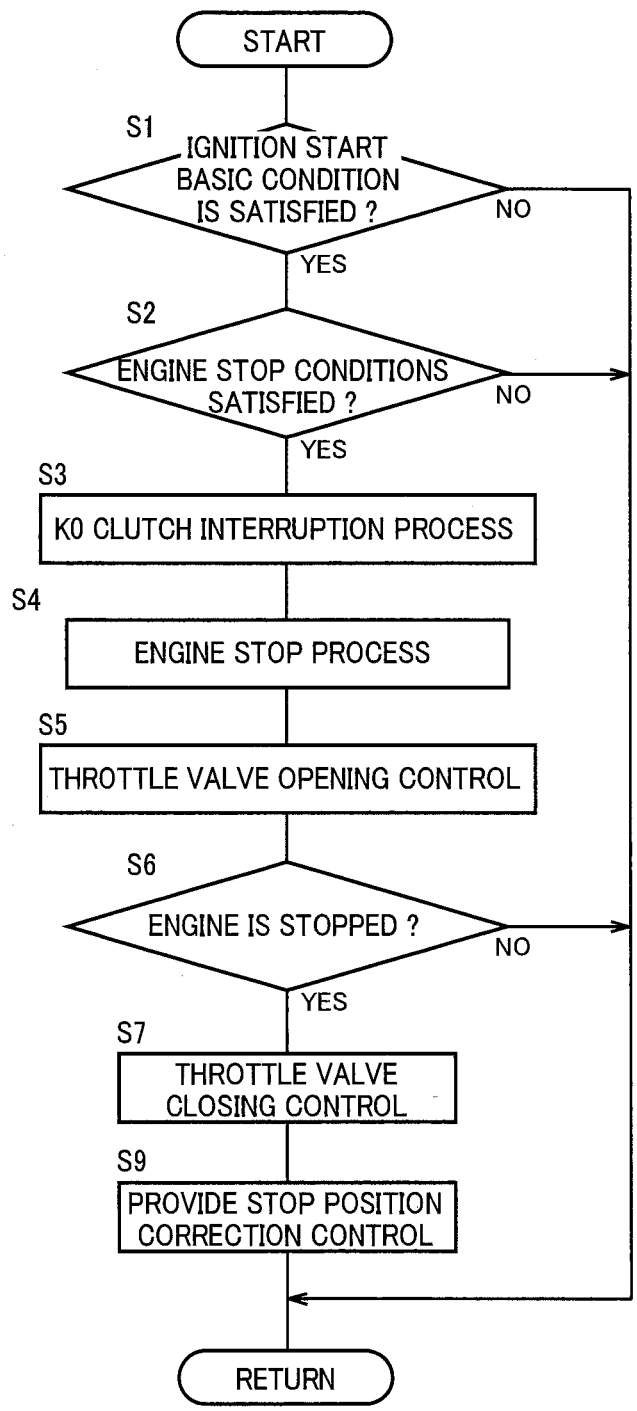
FIG. 11 is a diagram for explaining yet another example of the present invention and a flowchart used instead of FIG. 3.

FIG. 11 is a flowchart used instead of FIG. 3 and, in the example of FIG. 3, it is determined at step S8 whether the stop crank angle φstop of the direct injection engine 12 is within the range of the target stop range φtarget and if the angle is out of the range of the target stop range φtarget, the stop position correction control of step S9 is provided; however, in the example of FIG. 11, the determination of step S8 is omitted, and the stop position correction control of step S9 is always provided following the closing control of the electronic throttle valve 45 of step S7. In particular, the stop position correction control is always provided to rotate the crankshaft 114 by the friction engagement of the K0 clutch 34 regardless of the stop position of the crankshaft 114 at the time of engine stop and, since the control can rapidly be provided, the stop position correction control can properly be provided within the time when the pumping action is acquired, and the control is simplified and the device is inexpensively configured. In this case, even when the stop position of the crankshaft 114 is within the range of the target stop range φtarget suitable for the ignition start of the direct injection engine 12, the stop position correction control is provided and the crankshaft 114 is rotated by the engagement control of the K0 clutch 34; however, in the case of the multi-cylinder direct injection engine 12 having four or more cylinders, the crankshaft 114 is automatically swung back into the range of the target stop range φtarget due to the pumping action, causing no problem. The engagement torque of the K0 clutch 34 in the stop position correction control of step S9 is sufficiently small as compared to the crest of the pumping energy and has no risk of causing the crankshaft 114 to rotate and climb on the crest.

Fifth Example

FIG. 12 is a flowchart used instead of FIG. 3 and is different in that step S8-1 is provided instead of step S8 as compared to the example of FIG. 3. In particular, it is determined at step S8 whether the stop crank angle φstop of the direct injection engine 12 is within the range of the target stop range φtarget and if the angle is out of the range of the target stop range φtarget, the stop position correction control of step S9 is provided; however, at step S8-1 of FIG. 11, it is determined whether the stop crank angle φstop is near the compression TDC within a range of about ±10 degrees from the compression TDC, for example, and if the angle is near the compression TDC, the stop position correction control of step S9 is provided. Therefore, the stop position correction control is provided only when the crankshaft 114 at the time of engine stop is stopped near the compression TDC that is a crest of the pumping energy and, even in this case, since the K0 clutch 34 is frictionally engaged by the stop position correction control to rotate, the crankshaft 114 is rotated from near the compression TDC and stopped within the range of the target stop range φtarget in combination with the pumping action, and the same action effect as the example is acquired such as a proper ignition start at the next engine start and a reduction in the assist torque.

Although the examples of the present invention have been described in detail with reference to the drawings, these examples are merely an embodiment and the present invention may be implemented in variously modified and improved forms based on the knowledge of those skilled in the art.

NOMENCLATURE OF ELEMENTS

10: hybrid vehicle 12: direct injection engine 34: K0 clutch 45: electronic throttle valve (intake air amount adjustment valve) 58: crank angle sensor 70: electronic control device 80: engine stop control means 82: engine stopping means 84: throttle opening means 86: crank angle determining means 88: clutch engaging means 100: cylinder 114: crankshaft MG: motor generator (rotating machine) φ: crank angle φtarget: target stop range

The invention claimed is:

1. An engine stop control device of a hybrid vehicle comprising:
   a plurality of cylinders, a direct injection engine directly injecting fuel into the cylinders,
   a clutch connecting/disconnecting the direct injection engine to/from a power transmission path, and
   a rotating machine at least acting as an electric motor,
   the hybrid vehicle using the direct injection engine and the rotating machine as a drive power source for running and performing an ignition start for starting the direct injection engine by injecting fuel into the cylinders with a piston stopped in an expansion stroke while an assist torque is provided by the rotating machine,
   when the clutch is interrupted to stop the direct injection engine during running, the once interrupted clutch being temporarily connected at the time of the engine stop or immediately after the engine stop and within a time when a pumping action due to compression of air in the cylinders is acquired, and thereby a crankshaft being separated from a crest of a pumping energy generated near compression top dead center at which a piston in any of the cylinders of the direct injection engine reaches a top dead center after a compression stroke and the crankshaft being stopped automatically at a crank angle defined to correspond to a minimum region of the pumping energy.

2. The engine stop control device of a hybrid vehicle of claim 1, wherein
   the connection process of the clutch is defined such that the crankshaft is stopped within a predefined target stop range suitable for the ignition start.

3. The engine stop control device of a hybrid vehicle of claim 1, wherein
   the connection process of the clutch generates a connection torque capable of overcoming friction of the direct injection engine to rotate the crankshaft, and wherein if a crank angle exceeds a predefined control stop position, the clutch is immediately interrupted.

4. The engine stop control device of a hybrid vehicle of claim 1, wherein
   the connection process of the clutch generates a connection torque capable of overcoming friction of the direct injection engine to rotate the crankshaft, for a constant time defined in advance.

5. The engine stop control device of a hybrid vehicle of claim 2, wherein
   the connection process of the clutch is provided if a stop position of the crankshaft at the time of the engine stop is deviated from the target stop range, and wherein the stop position of the crankshaft is estimated based on a swing-back point of the crankshaft.

6. The engine stop control device of a hybrid vehicle of claim 1, wherein
   the connection process of the clutch is provided regardless of a stop position of the crankshaft at the time of the engine stop.

7. The engine stop control device of a hybrid vehicle of claim 1, wherein
   when the clutch is interrupted to stop the direct injection engine, an intake air amount adjustment valve is subjected to opening control.

8. The engine stop control device of a hybrid vehicle of claim 1, wherein
   when the clutch is temporarily connected, output of the rotating machine is increased.

9. The engine stop control device of a hybrid vehicle of claim 1, wherein
   the engine stop control device is configured, when the clutch is interrupted to stop the direct injection engine during running, to estimate a stop position of the crankshaft based on a swing-back point that corresponds to an angle of the crankshaft when a rotation speed of the engine becomes zero for the first time, and
   the engine stop control device is configured, when the estimated stop position of the crankshaft is deviated from a predetermined target range, to temporarily connect the once interrupted clutch with a connection torque that enables the crankshaft to be separated from the crest of the pumping energy, whereby the crankshaft is stopped automatically at the crank angle defined to correspond to the minimum region of the pumping energy.

* * * * *